United States Patent
Schoeneck et al.

(10) Patent No.: US 6,793,064 B2
(45) Date of Patent: Sep. 21, 2004

(54) RETRACTABLE TRANSFER DEVICE METERING AND PRODUCT ARRANGING AND LOADING APPARATUS AND METHODS

(75) Inventors: Richard Jerome Schoeneck, Alexandria, MN (US); Ronald Matthew Gust, Miltona, MN (US)

(73) Assignee: Douglas Machine, Inc., Alexandria, MN (US)

( * ) Notice: Subject to any disclaimer, the term of this patent is extended or adjusted under 35 U.S.C. 154(b) by 0 days.

(21) Appl. No.: 10/366,130

(22) Filed: Feb. 12, 2003

(65) Prior Publication Data

US 2004/0154902 A1 Aug. 12, 2004

(51) Int. Cl.[7] .............................................. B65G 47/26
(52) U.S. Cl. .................. 198/419.3; 198/426; 198/418.7
(58) Field of Search .......................... 198/418.7, 419.3, 198/426, 432, 433

(56) References Cited

U.S. PATENT DOCUMENTS

| | | |
|---|---|---|
| 1,874,669 A | 8/1932 | Wagner |
| 2,050,547 A | 8/1936 | Thayer |
| 2,678,151 A | 5/1954 | Geisler |
| 2,756,553 A | 7/1956 | Ferguson et al. |
| 2,918,765 A | 12/1959 | Currivan |
| 2,971,309 A | 2/1961 | Miskel et al. |
| 3,108,679 A | 10/1963 | Woody ..................... 198/468.6 |
| 3,201,912 A | 8/1965 | Wozniak |
| 3,210,904 A | 10/1965 | Banks |

(List continued on next page.)

FOREIGN PATENT DOCUMENTS

| | | |
|---|---|---|
| DE | 1247216 | 8/1967 |
| EP | 0659664 | 6/1995 |
| JP | 1-162621 | * 6/1989 ............... 198/418.7 |
| JP | 5170332 | 7/1993 ............ B65G/47/52 |

OTHER PUBLICATIONS

US 5,457,940, 10/1995, Ziegler et al. (withdrawn)

Primary Examiner—James R. Bidwell
(74) Attorney, Agent, or Firm—Alan D. Kamrath; Nikolai & Mersereau, P.A.

(57) ABSTRACT

Product is conveyed as a continuous stream by a meter conveyor (12) unto a transfer plate (32) and a transfer device (42). The transfer device (42) is movable between a retracted position and an extended position extending over a sweep conveyor (22). In a preferred form, the transfer device (42) is in the form of a thin piece of flexible material and is moved in the conveying direction from the retracted position to the extended position by engaging with the sweep conveyor (22) and is moved to the retracted position by being wrapped around a rotated roller (46). Product is transferred from the transfer device (42) to the sweep conveyor (22) as the transfer device (42) moves from the extended position to the retracted position and is engaged by a metering bar (52ba) which controls the product acceleration on the sweep conveyor (22) to match the meter conveyor (12) until the product group leaves the transfer device (42). With nested product, the leading edge of the transfer device (42) can be scalloped to represent the product bottom leading edge. Alternatively, nestable product is conveyed by the meter conveyor (12) through a guide rail unit (82) including an infeed portion (84) for conveying product in a conveying direction, a nesting portion (86) at an arranging angle (N) to the conveying direction, and an aligning portion (88) at a grid angle (Z) to the nesting portion (84) to align the product in a square grid pattern when transferred unto the transfer device (42). Similarly, product in a grid pattern can be conveyed by the meter conveyor (12) through the guide rail unit (82) onto a loader conveyor (102). A pack pattern is pushed by a pusher (132) from the loader conveyor (102) between a loader guide (106) abutting with the leading row of the pack pattern and a retractable loader guide (110) abutting with the last row of the pack pattern.

20 Claims, 5 Drawing Sheets

U.S. PATENT DOCUMENTS

| | | | |
|---|---|---|---|
| 3,323,281 A | 6/1967 | Talbot | |
| 3,444,980 A | 5/1969 | Wiseman | |
| 3,483,668 A | 12/1969 | Frost et al. | |
| 3,513,623 A | 5/1970 | Pearson | |
| 3,524,295 A | 8/1970 | Spaulding | |
| 3,555,770 A | 1/1971 | Rowekamp | |
| 3,579,956 A | 5/1971 | Hoffmann et al. | |
| 3,645,068 A | 2/1972 | Langen | |
| 3,660,961 A | 5/1972 | Ganz | |
| 3,767,027 A | 10/1973 | Pund et al. | |
| 3,778,959 A | 12/1973 | Langen et al. | |
| 3,805,476 A | 4/1974 | Kawamura et al. | |
| 3,826,058 A | 7/1974 | Preisig | |
| 3,938,650 A * | 2/1976 | Holt | 198/433 |
| 3,941,236 A | 3/1976 | Hagedorn | |
| 3,956,868 A | 5/1976 | Ganz et al. | |
| 3,979,878 A | 9/1976 | Berney | |
| 4,041,677 A | 8/1977 | Reid | |
| 4,237,673 A | 12/1980 | Calvert et al. | |
| 4,385,482 A | 5/1983 | Booth | |
| 4,421,229 A | 12/1983 | Pan et al. | |
| 4,469,219 A | 9/1984 | Cosse | 198/460.2 |
| 4,479,574 A | 10/1984 | Julius et al. | |
| 4,555,892 A | 12/1985 | Dijkman | |
| 4,566,248 A | 1/1986 | Cooley | |
| 4,611,705 A | 9/1986 | Fluck | |
| 4,642,927 A | 2/1987 | Zamacola | |
| 4,768,329 A | 9/1988 | Borrow | |
| 4,802,324 A | 2/1989 | Everson | |
| 4,815,251 A | 3/1989 | Goodman | |
| 4,844,234 A | 7/1989 | Born et al. | |
| 4,887,414 A | 12/1989 | Arena | |
| 4,895,245 A | 1/1990 | Bauers et al. | |
| 4,936,077 A | 6/1990 | Langen et al. | |
| 4,961,488 A | 10/1990 | Steeghs | 198/357 |
| 4,962,625 A | 10/1990 | Johnson, Jr. et al. | |
| 5,012,916 A * | 5/1991 | Cruver | 198/419.3 |
| 5,036,644 A | 8/1991 | Lashyro et al. | |
| 5,070,992 A | 12/1991 | Bonkowski | |
| 5,237,795 A | 8/1993 | Cheney et al. | |
| 5,241,806 A | 9/1993 | Ziegler et al. | |
| 5,347,796 A | 9/1994 | Ziegler et al. | |
| 5,437,143 A | 8/1995 | Culpepper et al. | |
| 5,456,058 A | 10/1995 | Ziegler | |
| 5,469,687 A | 11/1995 | Olson | |
| 5,477,655 A | 12/1995 | Hawley | |
| 5,546,734 A | 8/1996 | Moncrief et al. | |
| 5,579,895 A | 12/1996 | Davis, Jr. et al. | |
| 5,630,311 A | 5/1997 | Flix | |
| 5,638,663 A | 6/1997 | Robinson et al. | |
| 5,666,789 A | 9/1997 | Ziegler | |
| 5,667,055 A * | 9/1997 | Gambetti | 198/418.7 |
| 5,727,365 A | 3/1998 | Lashyro et al. | |
| 5,755,075 A | 5/1998 | Culpepper | |
| 5,765,336 A | 6/1998 | Neagle et al. | |
| 5,778,634 A | 7/1998 | Weaver et al. | |
| 6,058,679 A | 5/2000 | Ziegler et al. | |
| 6,202,827 B1 * | 3/2001 | Drewitz | 198/433 |
| 2003/0183484 A1 | 10/2003 | Peterman et al. | |
| 2003/0234156 A1 | 12/2003 | Schoeneck | |

* cited by examiner

FIG. 5

RETRACTABLE TRANSFER DEVICE METERING AND PRODUCT ARRANGING AND LOADING APPARATUS AND METHODS

BACKGROUND

The present invention generally relates to apparatus and methods for metering product from a continuous stream into a product group and/or pack pattern, particularly to metering apparatus and methods not requiring windows between product in the continuous stream, more particularly to metering apparatus and methods which are versatile to meter a wide variety of product such as cans, plastic bottles, jars, cartons, bundles, or trays, and specifically to metering apparatus and methods where product is metered by moving a transfer device from underneath a product group positioned above a sweeping conveyor. In other preferred aspects, the present invention generally relates to apparatus and methods for arranging nestable products into a grid pattern which is preferably conveyed without inner lane guides, with the arranging apparatus and methods producing synergistic results when utilized with the metering apparatus and methods of the present invention. In still other preferred aspects, the present invention generally relates to apparatus and methods for transferring a product group and/or pack pattern from one conveyance mechanism to a second conveyance mechanism.

In a typical packaging operation, product comes to a packaging machine in a continuous stream. It is necessary to separate product into groups so that they can be further processed such as being placed into a pack pattern and/or packed into a film overwrap or a corrugated wrap. U.S. Pat. Nos. 4,832,178 and 5,201,823 represent one manner of metering product utilizing pins which are inserted between product in lanes. However, it should be appreciated that such pin metering apparatus can only be utilized for product presenting windows between product. Additionally, such pin metering apparatus includes pins, rails, and supports between each lane of product which are multiple, high wear, moveable components and are very difficult and expensive to change over between different products. Other metering designs which control product from the side or top also require many parts, are complex, and are difficult to adjust.

Furthermore, in typical packaging operations, products are transferred between conveyance mechanisms after separation into product groups and/or pack patterns in order to place the product group on a tray, pad, or other wrap for further processing. Typically, conventional packaging operations require that the conveyance mechanisms convey product along parallel paths in the same direction. Thus, they have a lengthy footprint requiring large areas for operation.

Thus, a need continues to exist for apparatus and methods for metering and arranging product which do not suffer from the deficiencies of prior apparatus, especially those of prior pin metering apparatus. In particular, such apparatus and methods should be versatile enough to meter a range of product sizes and shapes including product which does not have windows between abutting product and can be changed over between different product sizes and shapes with minimum effort or expense, which is relatively low wear and maintenance, and which is relatively trouble free.

There also continues to exist a need for apparatus and methods for transferring product in pack patterns between conveyance mechanisms that provide for conveyance in different directions and which can result in shorter footprints.

SUMMARY

The present invention solves this need and other problems in the field of metering apparatus and methods by providing, in most preferred aspects, a transfer device upon which product is transferred while in an extended position extending over a product conveyance mechanism. The product is removed from the transfer device when the transfer device is moved to a retracted position from beneath the product which is prevented from moving with the transfer device to the retracted position such as by abutting with the remaining product in a continuous stream being advanced towards the transfer device.

In most preferred forms, the transfer device is in the form of a thin piece of flexible material which engages and is pulled by the product conveyance mechanism from its retracted position to its extended position and is wrapped around a rotatable roller to move from its extended position to its retracted position. In a preferred form, the transfer device is in the form of a piece of material having a leading edge which is scalloped to represent the nonlinearly straight, lead bottom edge of product being transferred.

In other preferred aspects, the lead product is abutted as it is transferred unto a product conveyance mechanism by a metering bar which is moving at a speed equal to the product before it is transferred unto the product conveyance mechanism and less than the speed of the product conveyance mechanism until the entire product group is transferred on the product conveyance mechanism to thereby retain the product in the group while it is being transferred to the product conveyance mechanism.

In still other aspects of the present invention, product being conveyed in a conveying direction and preferably in individual columns are guided at an arranging angle to move simultaneously parallel and perpendicular to the conveying direction into a nested pattern, with the nested pattern being guided into a grid pattern so that the columns extend parallel to the conveying direction and the rows extending perpendicular to the conveying direction with the columns and rows abutting.

In further aspects of the present invention, product is guided and conveyed in a grid pattern in a conveying direction onto an unloader platform and in a pack pattern which is pushed while the rows and columns in the pack pattern abut.

It is thus an object of the present invention to provide novel apparatus and methods for metering product.

It is further an object of the present invention to provide such novel metering apparatus and methods not requiring the presentation of windows between abutting product.

It is further an object of the present invention to provide such novel metering apparatus and methods versatile enough to meter product of different sizes and shapes including but not limited to cans, bottles, jars, cartons, bundles and trays.

It is further an object of the present invention to provide such novel metering apparatus and methods allowing nesting of products in the continuous stream of product to minimize product surge.

It is further an object of the present invention to provide such novel metering apparatus and methods providing an easy manner of retaining product as a group by controlling the acceleration of product on the product conveyance mechanism.

It is further an object of the present invention to provide a novel transfer device including a scalloped leading edge for use in such novel metering apparatus and methods.

It is further an object of the present invention to provide novel apparatus and methods for arranging nestable products in a square grid pattern for further packaging operations.

It is further an object of the present invention to provide such novel apparatus and methods which can be easily changed over between different product and/or different product group sizes.

It is further an object of the present invention to provide such novel apparatus and methods for transferring product in pack patterns for conveyance in different directions which can result in shorter apparatus footprints.

It is further an object of the present invention to provide such novel apparatus and methods for loading product in pack patterns.

It is further an object of the present invention to provide such novel apparatus and methods minimizing the number and complexity of components, with few high wear components.

It is further an object of the present invention to provide such novel apparatus and methods which eliminate or control physical registration forces during operation.

It is further an object of the present invention to provide such novel apparatus and methods allowing easy access to the product from the top and side and to the bottom of the apparatus for maintenance and cleaning.

These and further objects and advantages of the present invention will become clearer in light of the following detailed description of an illustrative embodiment of this invention described in connection with the drawings.

DESCRIPTION OF THE DRAWINGS

The illustrative embodiment may best be described by reference to the accompanying drawings where.

All figures are drawn for ease of explanation of the basic teachings of the present invention only; the extensions of the figures with respect to number, position, relationship, and dimensions of the parts to form the preferred embodiment will be explained or will be within the skill of the art after the following description has been read and understood. Further, the exact dimensions and dimensional proportions to conform to specific force, weight, strength, and similar requirements will likewise be within the skill of the art after the following description has been read and understood.

Where used in the various figures of the drawings, the same numerals designate the same or similar parts. Furthermore, when the terms "side," "end," "bottom," "first," "second," "laterally," "longitudinally," "row," "column," and similar terms are used herein, it should be understood that these terms have reference only to the structure shown in the drawings as it would appear to a person viewing the drawings and are utilized only to facilitate describing the illustrative embodiment.

DESCRIPTION OF THE PREFERRED EMBODIMENTS

Figure 1:
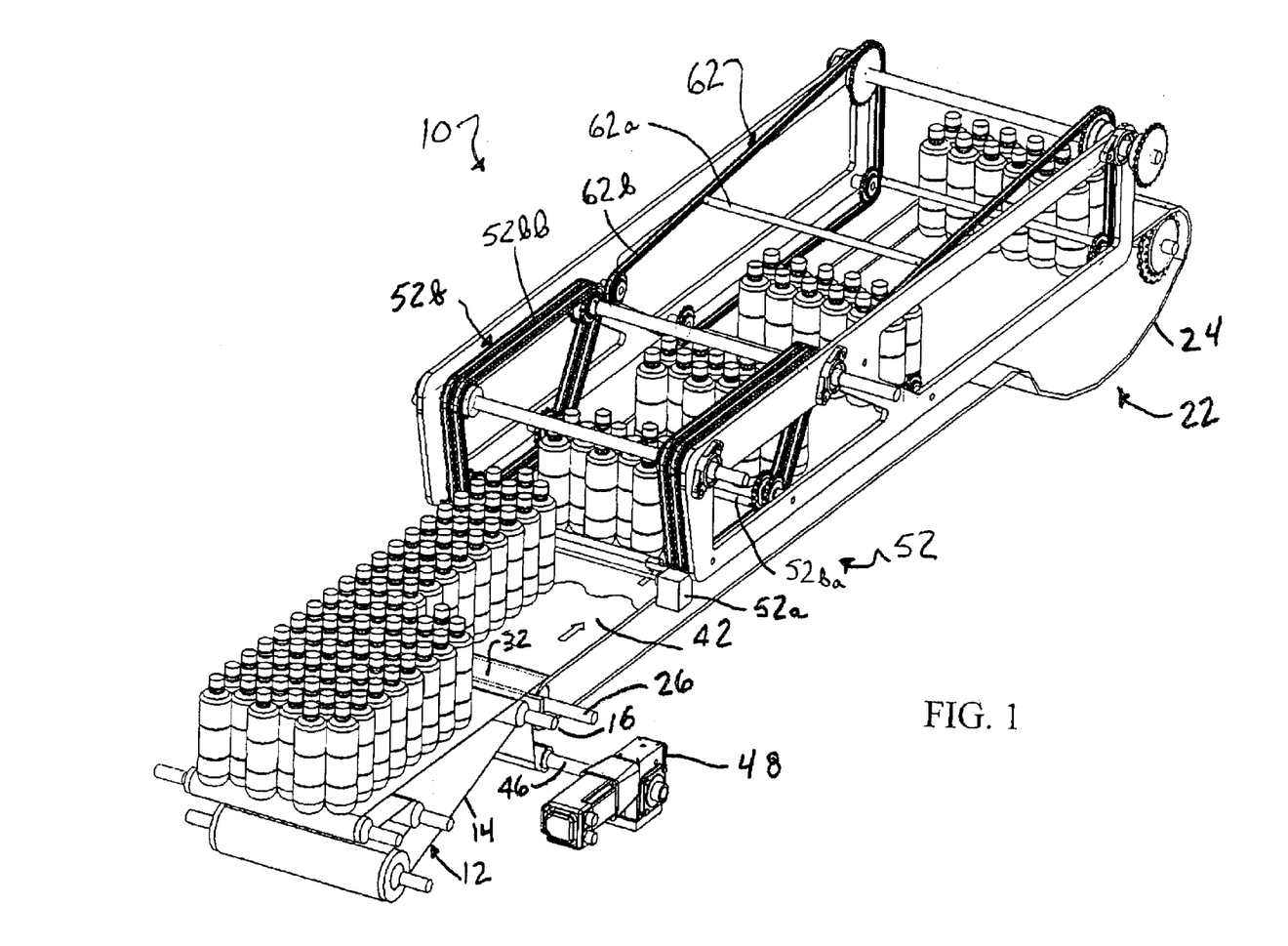
FIGS. 1 and 2 show partial, perspective views of a metering apparatus utilizing preferred methods according to the preferred teachings of the present invention, with portions and product being removed to show constructional details, with the transfer device being in its extended position and retracted position, respectively.
Figure 2:
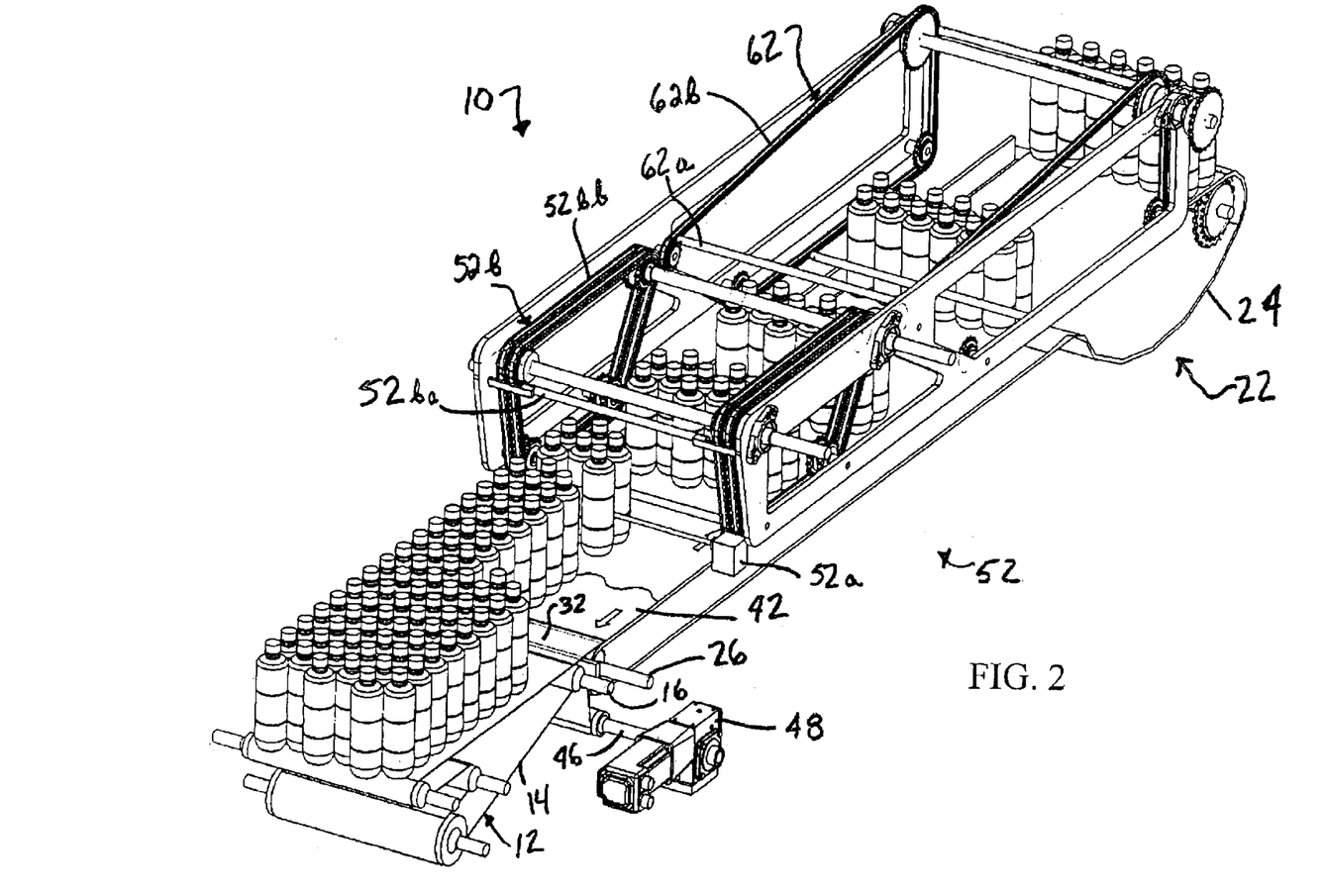

An apparatus for metering product and in particular to apparatus which collates and separates groups of product in preparation for various types of packaging of the most preferred form is shown in the drawings and generally designated 10. Generally, apparatus 10 includes first and second product conveyance mechanisms which are independently driven for moving product in a conveying direction. In the most preferred form, the conveying direction of the first and second product conveyance mechanisms are colinear to each other, with the product being transferred from the first product conveyance mechanism where they are bunched together unto the second product conveyance mechanism where they are separated, typically into groups. However, it should be recognized that the first and second product conveyance mechanisms could have other arrangements including linearly parallel, perpendicular or at a arranging angle of nested product. In the most preferred form, the first product conveyance mechanism is shown as a meter conveyor 12 which is driven at variable speeds such as by a servo motor. In the preferred form, conveyor 12 includes an endless belt 14 including an upper run extending between an upstream roller and a downstream roller 16. It should be realized that conveyor 12 can include one or more additional rollers, with one or more of the rollers 16 being rotated such as by a servo motor to cause movement of belt 14.

In the most preferred form, the second product conveyance mechanism is shown as a sweep conveyor 22 which is separately driven from conveyor 12 and typically in a continuous manner such as by a servo motor. In the preferred form, conveyor 22 includes an endless belt 24 including an upper run extending between an upstream roller 26 and a downstream roller. It should be realized that conveyor 22 can include one or more additional rollers, with one or more of the rollers 26 being rotated such as by a servo motor to cause movement of belt 24. In the most preferred form, the upper runs of belts 14 and 24 are in the same plane, and possibly the upper run of belt 24 being parallel to but slightly lower than the upper run of belt 14.

Due to the circular cross sections of rollers 16 and 26 in the most preferred form, a gap is created between belts 14 and 24. In the preferred form, a flat, stationary transfer plate 32 extends between the upper runs of belts 14 and 24 generally between the mid point of rollers 16 and 26. Thus, lead product is pushed by the continuous stream being advanced by conveyor 12 onto and past transfer plate 32 in a manner described hereinafter.

Apparatus 10 according to the teachings of the present invention includes a product transfer device 42 upon which product is supported and in the preferred form has an upper surface of a size upon which the bottom of the product is supported and in the most preferred form to receive product having multiple rows and multiple columns. Transfer device 42 is moveable between an extended position and a retracted position. Device 42 extends over conveyor 22 in the extended position and in the preferred form also extends over conveyor 22 beyond transfer plate 32 in the retracted position. In the most preferred form, device 42 is in the form of a thin piece of flexible material such as a belt requiring external support to allow product to be supported thereon. Thus, in the preferred form, device 42 in the form of a thin piece of material engages and is supported by belt 24 to allow product to be supported upon device 42. In the preferred form, device 42 is moved from its extended position to its retracted position by having its upstream end secured to the periphery of a roller 46 which is rotated such as by a servo motor 48. Thus, as roller 46 is rotated, device 42 is wrapped around roller 46 and thereby has a shorter exposed length. In the most preferred form, device 42 is moved from its retracted position to its extended position by movement with belt 24 of conveyor 22 as the result of friction between device 42 and belt 24, with servo motor 48 tending to limit the velocity of device 42 to equal that of conveyor 12. It should be appreciated that device 42 could be moved by other manners including but not limited to by being reciprocated such as by air cylinders or like. Likewise, device 42 could be formed in other manners such as a flat piece of nonflexible material which does not rely upon belt 24 for external support and which could be slid under transfer plate 32 in its retracted position. However, it is believed that the flexible material forming device 42 is advantageous for several reasons including inertia concerns, costs, and the like.

Apparatus 10 according to the teachings of the present invention further includes a control device 52 for registering the leading edge of the product group on transfer device 42 in its extended position. In the most preferred form, device 52 includes a photo eye 52a and/or a metering bar mechanism 52b. Basically, photo eye 52a passes a beam of light across sweep conveyor 22 at the location where the leading edge of the product group on transfer device 42 is in its extended position. When one or more product breaks this light beam, the speed of meter conveyor 12 is adjusted or stopped, with servo motor 48 simply repeating its pattern every cycle in the most preferred form. Thus, photo eye 52a ensures that product is always in the required position when transfer device 42 moves from the extended position to the retracted position and compensates for the potential compressing or inconsistency of product located on device 42.

Metering bar mechanism 52b generally includes a plurality of metering bars 52ba extending laterally across sweep conveyor 22 which are carried along an endless path such as by belts, chains or other transmission device 52bb. Specifically, in a portion of the path, metering bars 52ba move in the conveying direction of conveyor 22 at least initially at the conveyance speed of conveyor 12. Generally, the leading edge of product on sweep conveyor 22 abuts against a respective metering bar 52ba which may serve to prevent tipping of the product upon sweep conveyor 22 as well as to physically restrain product on sweep conveyor 22.

According to the teachings of the present invention, apparatus 10 further includes a mechanism 62 which collects product together and delivers the product to the next appropriate packaging function such as film overwrap or corrugated wrap in a finished form. In the most preferred form, mechanism 62 is a sweeping bar mechanism generally including a plurality of sweep bars 62a extending laterally across sweep conveyor 22 and which are carried along an endless path such as by belts, chains or other transmission device 62b. Generally, sweep bar mechanism 62 is located downstream of metering bar mechanism 52b, with sweep bar 62a being introduced between product on sweep conveyor 22 for abutting with the trailing edge of product on sweep conveyor 22. In the most preferred form, sweep conveyor 22 and sweep bar mechanism 62 are driven together such as by a servo motor.

Now that the basic construction of apparatus 10 according to the preferred teachings of the present invention has been set forth, modes of operation and advantages of apparatus 10 can be explained. Generally, product is fed in a random basis to meter conveyor 12 where it accumulates. In particular, meter conveyor 12 preferably runs constantly but possibly at variable speed, and product is conveyed or pushed thereon. Products can be accumulated on and are conveyed by conveyor 12 as a continuous stream in multiple columns extending longitudinally along the streams and rows extending laterally across the stream or as a lane including a single column and multiple rows in a conveying direction at a first conveyance speed. Additionally, product can have a variety of shapes such as circular or rectangular cross sections. In particular, product can accumulate in a nested manner in the continuous stream on meter conveyor 12 such as in the case of circular cross sections. Nesting of products is very beneficial in apparatus 10 according to the teachings of the present invention as nesting and the lack of physical registration vastly minimizes product surge or in other words the high-pressure effect of one product pushing against another at the point of product release onto transfer device 42.

Products can also accumulate in a non-nested array manner in a single column or lane or in multiple columns. As an example, although the first product conveyance mechanism is shown in the preferred form as a single conveyor 12 in the preferred form, the first product conveyance mechanism could be in the form of parallel, multiple conveyors 12, each conveying a continuous stream of product. Alternatively, the first product conveyance mechanism can be in the form of a single conveyor 12 but with individual lane separator guides being placed over conveyor 12, with such individual lane separator guides being installed permanently or removable and/or adjustable such as by simply being slid to the side for convenient storage for use when desired.

It should be appreciated that in the case of nested or single column product, control device 52 can be in the form of photo eye 52a and metering bar mechanism 52b, if utilized, functions to prevent tipping of the product upon sweep conveyor 22 and/or controls acceleration of product on sweep conveyor 22 from device 42 to keep product together and precisely located on sweep conveyor 22 as it moves to sweep bars 62a. In the case of multiple column, non-nested packages, control device can be in the form of metering bar mechanism 52b which physically registers the leading edges of each of the multiple columns to be the same, with photo eye 52a possibly being eliminated.

For the sake of explanation, it will be assumed that device 42 is in its retracted position and product has been advanced by metering conveyor 12 to the free edge of device 42 or transfer plate 32. Device 42 is moved from its retracted position to its extended position such as by moving servo motor 48 such that device 42 moves and is carried by engaging with belt 24 of conveyor 22 in the conveying direction of conveyor 22. Simultaneously, during, or after device 42 is moved to its extended position, meter conveyor 12 is actuated to move belt 14 to push and thereby transfer product from belt 14 onto transfer plate 32 and onto device 42 in its extended position, with meter conveyor 12 being actuated until photo eye 52a senses product in the case of nested or single column product and/or until product engages a metering bar 52ba. In the latter case, meter conveyor 12 is actuated so that belt 14 travels a set time or distance corresponding to the desired product pattern depth.

Generally, after product has been transferred to device 42, device 42 is moved from its extended position to its retracted position, with the product being removed from device 42 by sliding from device 42 onto sweep conveyor 22 as the upstream product on conveyor 12, transfer plate 32 and device 42 abut with the continuous stream of product upon device 42 and thereby prevent product on device 42 from moving in an upstream direction with device 42 as device 42 moves from the extended position to its retracted position. In fact, in the preferred form where meter conveyor 12 constantly advances product, device 42 begins moving from its extended position towards its retracted position before the product intended to be removed reaches the released position over sweep conveyor 22. It should be noted that the distance moved should generally be equal to the desired product pattern depth and specifically a distance so that the last product(s) in the desired group of product are located sufficiently upon belt 24 such that they will travel with belt 24 and thereby are repositioned relative to transfer device 42 by conveyor 22. It should be appreciated that the leading edge of transfer device 42 should be insured to be located between product groups such as electronically by controlling transfer by meter conveyor 12 and/or by controlling servo motor 48 on the amount that transfer device 42 is moved. Alternately, physical registration adjustment is possible by moving control device 52 and/or transfer device 42.

It should be appreciated that product generally is in the same relationship in the group as in the continuous stream. Specifically, there is generally no separation of product in a direction perpendicular to the conveying direction or in other words between the columns and rows. Such separation occurs in prior pin metering apparatus which requires further alignment or railing to get into a compact group. Apparatus 10 according to the preferred teachings of the present invention releases product onto conveyor 22 in a compact group, eliminating the need for further railing. Additionally, an added benefit is that product in groups seem to be more stable than when product stands individually on conveyor 22.

After product transfer device 42 has reached its retracted position, this operation is repeated after a distance gap has been created on belt 24 between the product group previously traveling with belt 24 and the next product still on device 42 and before device 42 is again moved to its extended position. In the most preferred form, sweep conveyor 22 is moving in the same conveying direction as but at a higher velocity than meter conveyor 12 such that the product pattern is accelerated when moved from device 42 onto sweep conveyor 22 to create the physical separation between the product patterns and the contiguous stream of products on meter conveyor 12. This is beneficial as the velocity of meter conveyor 12 can approach being constant if device 42 can be moved from its extended position to its retracted position and again move towards its extended position as the leading product(s) in the continuous stream of product pass from transfer plate 32 after the previous product has passed onto belt 24.

Once product groups have been placed onto sweep conveyor 22 with physical separations between them, the product in the groups can be collected together and placed in a desired pack pattern, if not already so, such as by the use of meter bars 52ba entering ahead of the product groups on sweep conveyor 22 for delivery to the next appropriate packaging function including sweep bar mechanism 62 and such as but not limited to shrink-packing (film only, film and pad, and/or film and tray), tray loading, cartoning, sleeving or case packing.

It should be appreciated that apparatus 10 according to the teachings of the present invention is advantageous for several reasons. First, it is not necessary for the product to have windows between them in the continuous stream as was necessary with pin type metering. Particularly, apparatus 10 of the present invention can be utilized with product which have windows such as but not limited to cylindrical product, such as but not limited to cans, plastic bottles, and jars, product which do not have windows such as but not limited to rectangular parallelepipeds, such as in cartons and boxes, as well as product in the form of bundles or trays Thus, apparatus 10 is able to function with many types of product.

In this regard, it may be desired to manufacture device 42 to have a leading edge which is scalloped to have a shape representing the actual shape of the leading bottom edges of the nested pattern of product to be appropriately deposited onto conveyor 22, with the leading bottom edge of product not being linearly straight such as being circular as in the case of many cans, bottles, jars or the like. The advantage of such a scalloped shape is that the leading edge follows the following edge of the last row of the product group and the leading edge of the continuous stream as the following edge has a forward extent forward of the rearward extent of the leading edge due to the nested arrangement which could result in product being haphazardly released from or carried by device 42 if its leading edge were not scalloped. Although it would be necessary to have devices 42 scalloped to each of the potential nested patterns of products desired to be metered, device 42 can be a replacement part which is especially inexpensive when formed of belting or similar thin, flexible material. Additionally, leading edge of device 42 could have other shapes to help removal of product as transfer device 42 moves from its extended position.

Figure 3:
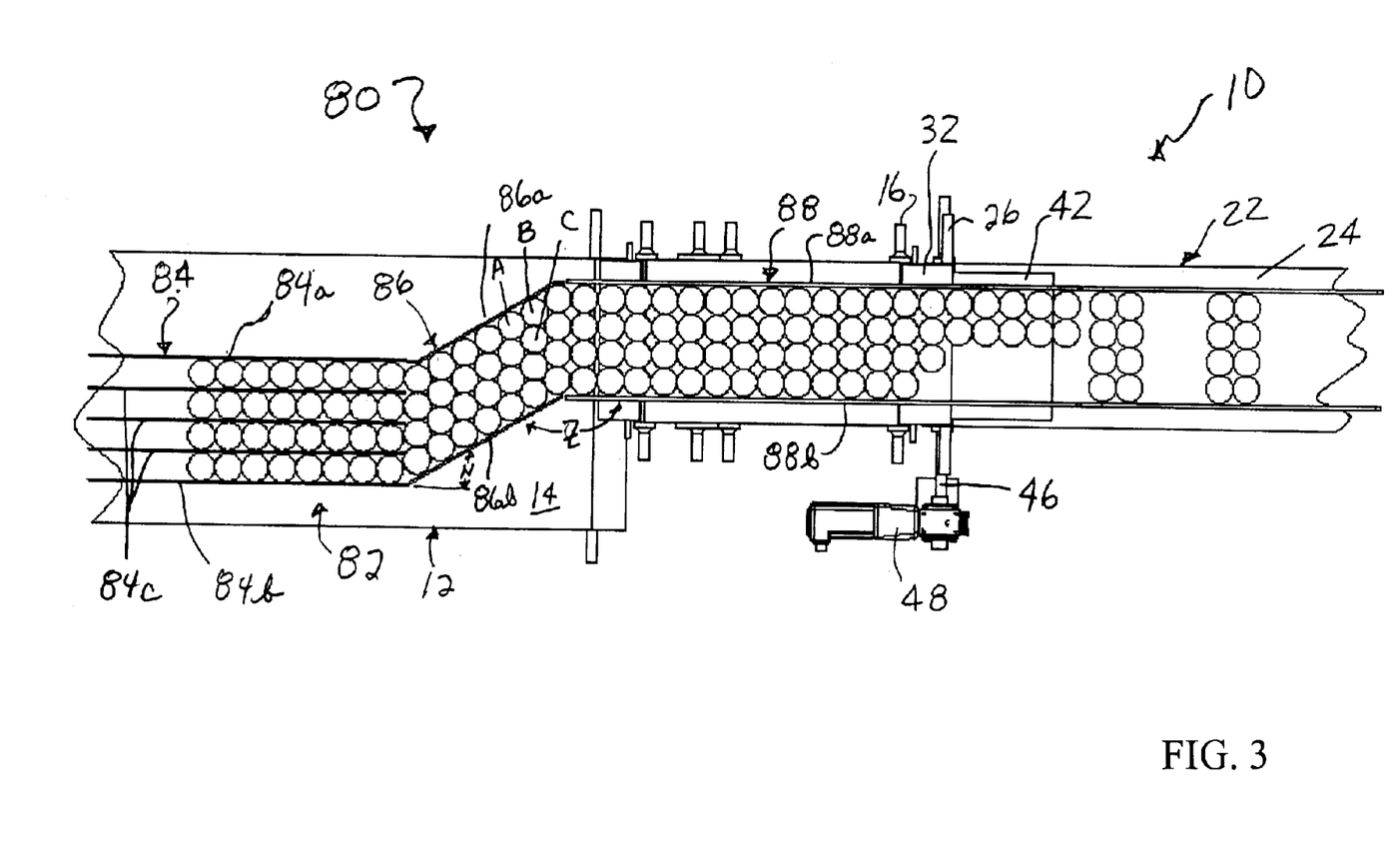
FIG. 3 shows a top plan view of an arranging apparatus and of portions of the metering apparatus of FIG. 1 utilizing methods according to the preferred teachings of the present invention, with portions and product being removed to show constructional 30 details.

Alternatively, product in a nested pattern could be arranged into a square grid pattern before their transfer unto device 42 such that the leading edge of the continuous stream does not have a forward extent forward of the rearward extent of the following edge of the last row of the product group. An apparatus for arranging and particularly denesting nestable product in preparation for metering according to the preferred teachings of the present invention is shown in FIG. 3 and generally designated 80. In the most preferred form, apparatus 80 utilizes the geometry of the nested arrangement to denest the product. Cylindrical products having circular cross sections which abut will be utilized in explaining the concept of the present invention. Specifically, in a nested arrangement, products in one column have centers located intermediate the centers of product in the adjacent column. Thus, as shown in FIG. 3, a line from the center of product A in one column will extend tangentially to abutting points of product B in the same column but in a downstream row and product C in the adjacent column and the same row as product B. A radial line from the center of product B will extend perpendicularly to the tangent line. A line between the centers of products A and B is a hypotenuse of a right triangle and has a length equal to the radius of product A plus the radius of product B and thus is twice the length of the radius of product B. Thus, the angle between the tangent line and the hypotenuse line must be 30° and the angle between the radial line and the hypotenuse must be 60°. Separation lines between the columns will be defined by tangents to products A and B parallel to the hypotenuse line, and separation lines between the rows will be defined by tangents to products B and C parallel to the radial line, with separation lines between the columns and rows intersecting at an angle of 60°.

Generally, apparatus 80 according to the teachings of the present invention includes a guide rail unit 82 positioned vertically above meter conveyor 12. Guide rail unit 82 according to the preferred teachings of the present invention generally includes a first, infeed portion 84, a second, nesting portion 86, and a third, aligning portion 88.

Infeed portion 84 of the preferred form shown generally includes outside lane infeed guides 84a and 84b extending in a spaced relation. Infeed portion 84 also includes one or more inner lane guides 84c in a spaced, parallel relation to guides 84a and 84b. The number of inner lane guides 84 in the preferred form is one less than the desired number of columns, with three guides 84c being shown in the preferred form where four columns of products are desired to be metered. The spacing of adjacent lane guides 84a–84c is generally equal to the width of the column which is of products having circular cross sections. It should be appreciated that product can be suitably received between adjacent lane guides 84a–84c such as being fed as a column. therebetween or as accumulating on conveyor 12 before portion 84 and dividing into columns by guides 84a–84c. The total spacing perpendicularly between guides 84a and 84b is generally equal to the width of the individual columns multiplied by the number of columns plus the combined widths of all guides 84c. Thus, product located on conveyor 12 and between lane guides 84a–84c are conveyed in a conveying direction which in the most preferred form is parallel to the movement direction of conveyor 12.

Nesting portion 86 generally includes outside lane nesting guides 86a and 86b extending from guides 84a and 84b, respectively, in a spaced parallel direction at an acute arranging angle N to the conveying direction of conveyor 12. In particular, for cylindrical product having circular cross sections, the arranging angle N in the preferred form shown is 30° corresponding to the hypotenuse line. It should be appreciated that guides 84c terminate in the infeed portion 84 and end at nesting portion 86 and that nesting portion 86 is free of inner lane guides which separate product into individual columns in the nested pattern. As a result of this change of direction and as product is not refrained from moving laterally relative to each other, product will nest together in nesting portion 86 where every other column will be offset in the direction of guides 86a and 86b by one product radius. The spacing between guides 86a and 86b perpendicular to the conveying direction of conveyor 12 and between the interconnections of guides 84a and 84b with guides 86a and 86b, respectively, is generally equal to the width of the individual columns multiplied by the number of columns while the spacing perpendicularly between guides 86a and 86b is less due to product nesting.

Aligning portion 88 generally includes outside lane grid guides 88a and 88b extending from guides 86a and 86b, respectively, in a spaced relation generally parallel to guides 84a–84c and to the conveying direction. Thus, lane guides 88a and 88b extend from guides 86a and 86b respectively at an obtuse grid angle Z which in the preferred form to produce a square grid pattern equals 150°. In the preferred form, where arranging angle N is 30° and grid angle Z is equal to 150°, the sum of angles N and Z is 180°. Aligning portion 88 is also free of inner lane guides which separate product into individual columns in the grid pattern in the most preferred form. The spacing perpendicularly between guides 88a and 88b and perpendicular to the conveying direction is generally equal to the width of the individual columns multiplied by the number of columns.

Product advances into infeed portion 84 until they abut with each other and is separated to form individual, continuous columns therein, which are prevented from nesting due to the presence of lane guides 84c extending parallel to the conveying direction. When product leaves portion 84 and specifically move past guides 84c, product will be guided at the arranging angle N while being conveyed in the conveying direction so that product moves simultaneously parallel to the conveying direction and perpendicular to the conveying direction. In particular as product leaves infeed portion 84, the pattern in portion 84 will remain oriented by nesting portion 86. Product will tend to nest together in portion 86 into a nest pattern with at least two columns extending parallel to guides 86a and 86b and to arranging angle N. The arranging angle N of guides 86a and 86b of the preferred form of 30° relative to guides 84a and 84b and the absence of inner lane guides between guides 86a and 86b and the decreased spacing perpendicularly between guides 86a and 86b generate the nest pattern shown. It should be appreciated that the separation lines between product rows are at complementary angle to grid angle Z and remain perpendicular to the conveying direction in the preferred form due to the 60° angle of the separation line between product columns moving along and parallel to guides 86a and 86b with the conveying direction. The columns in the nested pattern abut, and the rows in the nesting pattern abut, with the nested pattern being maintained by product being conveyed in infeed portion 84 by conveyor 12 upstream of nesting portion 86 and of the nested pattern. Nesting has the effect of physically registering one column to another. Basically, no one column can advance past another because they are grid locked together. This column to column registration is a primary function essential to the concept of the present invention. This grid lock function controls the column to column offset to maintain product in the desired pattern upstream and downstream of portion 84. Arranging angle N will therefore introduce a corresponding column to column offset change at portion 84 such as being in a square grid pattern when arranging angle N is 30° as described in the preferred form. Grid angle Z will therefore introduce a corresponding column to column offset change at portion 88 such as being in a square grid pattern when angle Z is 150° as described in the preferred form.

The alignment between product as they transition between portions 86 and 88 is similar to but reversed from the transition between portions 84 and 86. In particular, aligning portion 88 guides the nested pattern while the columns remain abutting and the rows remain abutting into a grid pattern. Product rows extend perpendicularly between guides 88a and 88b. Because guides 88a and 88b are parallel to the conveying direction, the product columns will be parallel to the conveying direction. Due to the perpendicular spacing between guides 88a and 88b and the nested product being conveyed in nesting portion 86 upstream of the aligning portion 88 and the grid pattern, product is maintained in the grid pattern and is prevented from moving from the grid pattern to a nested pattern. Thus, product in portion 88 is in a square grid pattern, with the practical difference being the absence of inner lane guides.

Meter conveyor 12 could include a single endless belt 14 or could be formed including multiple endless belts 14, with belt 14 intended to encompass constructions formed by a flexible sheet, multiple links, or other conveyance surfaces and types. However, it should be appreciated that product in portions 84 and 86 and upstream thereof should allow ease of sliding for accumulation and nesting purposes while product in portion 88 should generally prevent sliding of product for metering proposes. An advantage of utilizing conveyor 12 including separate endless belts 14 as shown in the preferred form is that each belt 14 can be manufactured for ease or lack of ease with sliding characteristics.

The square grid pattern is then available for further packaging operations such as but not limited to separation into pack patterns by creating a separation between adjacent rows in the grid pattern, with the use of apparatus 10 of the present invention believed to produce synergistic results with apparatus 80. Specifically, product in the square grid pattern can be transferred unto transfer device 42 for metering. Advantages of metering a square grid pattern according to the teachings of the present invention include but are not limited to removing the necessity for device 42 to have a scalloped leading edge, to make changeover between different products easier. Also, as there is no overlap between the rearward extent of the last row of the metered group and the leading edge of the continuous stream, it is easier to create wider separation such as for the insertion of metering bars 52$ba$ such that apparatus 10 can be operated at higher rates of speed. Likewise, the grid pattern also lends itself to electronic registration such as by the use of photoeye 52$a$ rather than physical registration. Additionally, product in the grid pattern and pack patterns separated therefrom have straight and tight columns and rows such that the need for devices and methods to collect product and place into the desired arrangement after metering is at least significantly reduced or eliminated. In this regard, product which are in contact when being metered are more stable than product standing apart. It should also be appreciated that apparatus 80 according to the teachings of the present invention can be easily changed over for different products by simply changing the number of inner lane guides 84$c$, if necessary, and adjusting the spacing of guides 84$a$, 86$a$ and 88$a$ as a unit relative to guides 84$b$, 86$b$ and 88$b$ as a unit. In this regard, lane guides 84$c$ are utilized only in infeed portion 84. Likewise, apparatus 80 according to the teachings of the present invention utilizes essentially passive geometry, with minimal components, and therefor has no moving functional parts to wear out, reducing production and operating costs.

Likewise, to change over to product groups having different group depths such as to change between groups having different product sizes or groups having a different number of rows, it is only necessary to adjust the distance that device 42 moves between its extended and retracted position and the speed of conveyor 12 such as by changing the controls to servo motor 48 in the preferred form and the drive for conveyor 12, to attach device 42 at a different length to roller 46, or to utilize a different device 42 which can be a relatively inexpensive replacement part. Thus, apparatus 10 according to the teachings of the present invention can be rapidly changed between product and pack pattern type and size.

Apparatus 10 and 80 according to the teachings of the present invention facilitates electronic registration such as by the use of photo eye 52$a$. Electronic registration removes forces of physical registration previously required for pin and other prior design metering, which could be sufficiently large to cause product damage. When physical registration is required utilizing apparatus 10 according to the teachings of the present invention, the forces on the product can be managed by controlling build up of product on conveyor 12.

It should be appreciated that apparatus 10 and 80 according to the teachings of the present invention is formed of relatively few moving parts, and the only part which would be subjected to wear is device 42, which in the preferred form is a relatively inexpensive replacement part. In particular, conveyors 12 and 22 and metering bar mechanism 52$b$, if utilized, are low wear and maintenance especially in comparison to the pin metering conveying mechanisms. Additionally, product is open from the top and generally open from the sides during the metering function of apparatus 10 according to the teachings of the present invention to allow easy access to product on conveyor 12 and/or 22. Likewise, apparatus 10 only requires roller 46 in the preferred form beneath conveyors 12 and 22 (and servo motor 48 to the side) for easy access to the bottom for maintenance and cleaning.

In the most preferred form, conveyor 22 moves at a higher velocity than conveyor 12 so that the product group accelerates from the continuous stream once they are supported directly on conveyor 22. This is advantageous because conveyor 12 can continuously operate without stopping even during the removal of product from transfer device 42 by moving in a direction opposite to the conveying direction of conveyor 12. However, it is possible to have conveyor 12 surge in velocity to transfer product onto device 42 and then decelerate to cause the separation between the metered product group and the continuous stream of product. Likewise, separation could be caused by other techniques including but not limited to combinations of the above.

It should be appreciated that metering bar mechanism 52$b$ performs an additional function according to the preferred teachings of the present invention. Specifically, in the most preferred form, conveyor 22 moves at a velocity greater than the velocity of product before it is transferred onto conveyor 22. As a result, product on conveyor 22 will separate from product still located upon transfer device 42 in the form shown to cause a physical separation therebetween if product was free to accelerate with conveyor 22. Basically, lead product on conveyor 22 initially contacts one of metering bars 52$ba$ generally when transfer device 42 begins moving from its extended position. As metering bars 52$ba$ travel generally at the velocity of product on transfer device 42, metering bars 52$ba$ control the acceleration of product to be less than conveyor 22 so that separation within the group of product does not occur. Once the entire group of product has been transferred from transfer device 42 onto conveyor 22, metering bars 52$ba$ can be accelerated to match the velocity of conveyor 22 or can be slid away from the leading product on conveyor 22 such that product on conveyor 22 is allowed to accelerate to match the speed of conveyor 22.

As set forth previously, apparatus 10 according to the teachings of the present invention allows nesting in the continuous stream which is very desirable. Thus, when separated into groups, product will be nested or will not be in the same physical relationships to each other as when they were in the continuous stream as variations in slippage between individual product in the group and conveyor 22. However, many packaging operations require the product group to be in an arranged pack pattern. According to the teachings of the present invention, metering bars 52$ba$ travel at a velocity slower than conveyor 22 and are in front of the product group to thereby limit acceleration of product. As a result, the product in group will slide on conveyor 22 (possibly with the help of side rails) relative to each other so that they will be located in an arranged pack pattern suitable for further packaging functions when engaged by sweep bars 62$a$. It should be realized where product is in an arranged pattern and electronic registration is possible using only photo eye 52$a$, where product does not have to be in a particular pattern, or the like, metering bar mechanism 52$b$ could be simply removed, such as by sliding to a noninterfering position above conveyor 22.

Now that the basic teachings of the present invention have been explained, many extensions and variations will be obvious to one having ordinary skill in the art. For example, although apparatus 10 of the most preferred form includes the combination of several, unique features believed to obtain synergistic results, apparatus could be constructed according to the teachings of the present invention including such features singly or in other combinations. In this regard, although the combination of apparatus 10 and 80 is believed to especially increase efficiency for cylindrical products, apparatus 10 according to the teachings of the present invention could be utilized without apparatus 80 such as for non-nesting products or with device 42 with a scalloped leading edge for nesting products. Likewise, apparatus 80 according to the teachings of the present invention could be utilized with other types and configurations of metering apparatus or with other packaging operations.

Additionally, it can be appreciated that conveyor 22 could be arranged to receive a tray or a pad before transfer device 42 is extended thereover or product transferred onto conveyor 22 according to the teachings of the present invention. Forming transfer device 42 from rigid material may be desirable in such instances. However, forming transfer device 42 of a thin piece of flexible material is believed to be advantageous for its low cost, low inertia and ease of adjustment.

The function of plate 32 is to allow product to be transferred from conveyor 12 to conveyor 22. However, it can be appreciated that this function can be accomplished in other manners as well known in the packaging art including but not limited to by the use of roller mechanisms, reshaping conveyors 12 and/or 22, or by utilizing other manners of product conveyance mechanisms. As an example, another possibility is using a moving conveyor transfer that consists of the tail shaft of sweep conveyor 22 and the head shaft of meter conveyor 12 having a fixed relationship to each other and which can laterally position itself (such as via a servo motor) underneath the appropriate product separation point and then in combination with meter bars 52ba advance the desired arrangement of product to conveyor 22.

It should be realized that although apparatus 10 and 80 are shown for processing a single product line, it should be appreciated that apparatus 10 and 80 can be banked together such as in a parallel arrangement to process multiple product lines according to the teachings of the present invention.

Likewise, apparatus 80 according to the teachings of the present invention could be utilized with other types and configurations of metering apparatus or with other packaging operations. As an example, apparatus 80 could be utilized with a loader apparatus 100 of the type shown in FIGS. 4 and 5. In particular, loader apparatus 100 of the preferred form includes a loader platform shown in the most preferred form as a loader conveyor 102 for receiving and moving product from conveyor 12 in the conveying direction of meter conveyor 12. In the most preferred form conveyors 12 and 102 have adjacent rollers with very small diameters such that the nip therebetween is sufficiently small to allow product to pass from conveyor 12 to conveyor 102 without disruption. However, a transfer plate 103 or other suitable transfer device can be positioned between conveyors 12 and 102.

Figure 4:
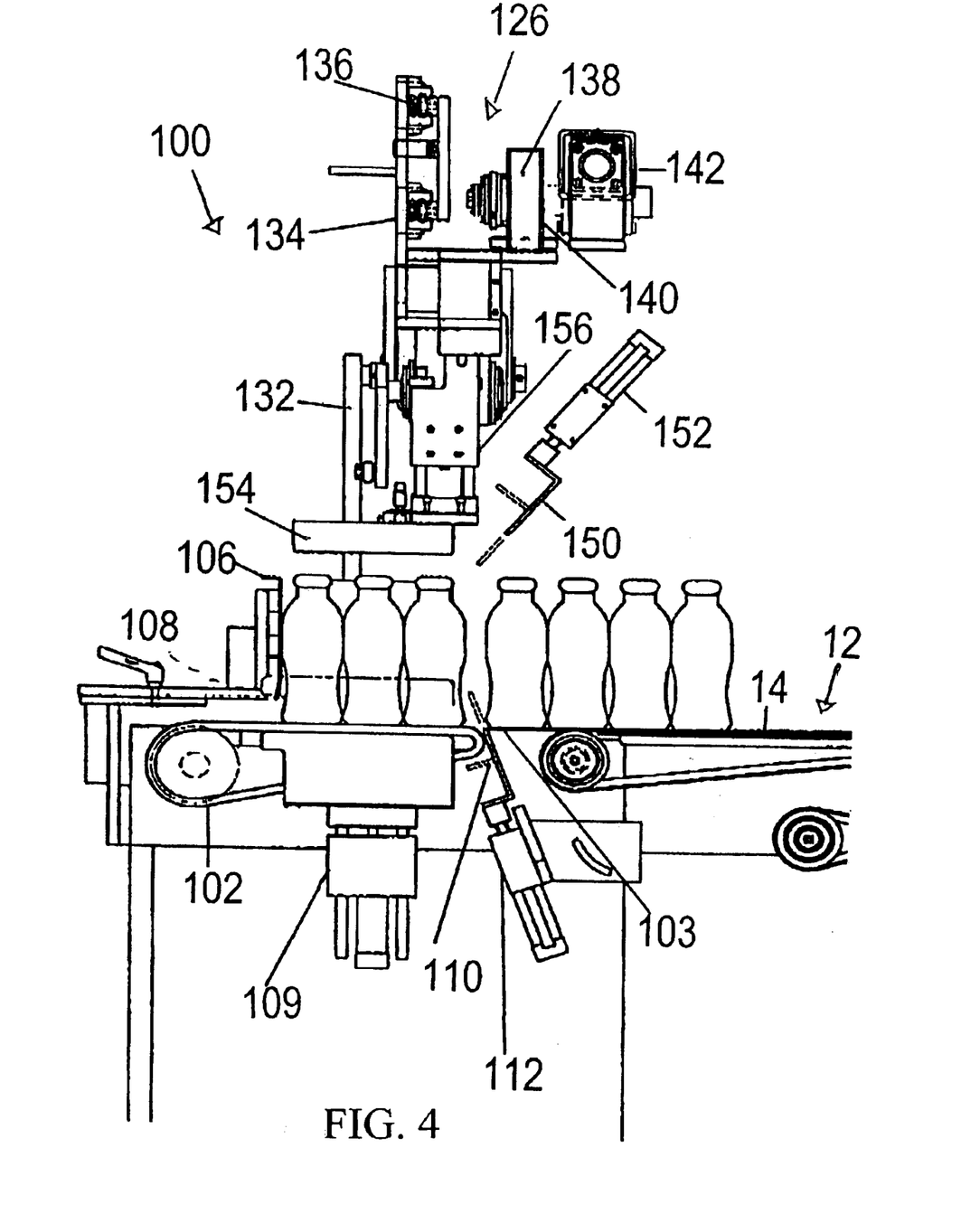
FIG. 4 shows a partial, front view of a loading apparatus and of portions of the metering apparatus of FIG. 1 utilizing methods according to the preferred teachings of the present invention, with portions and product being removed and/or shown in phantom to show construction details.
Figure 5:
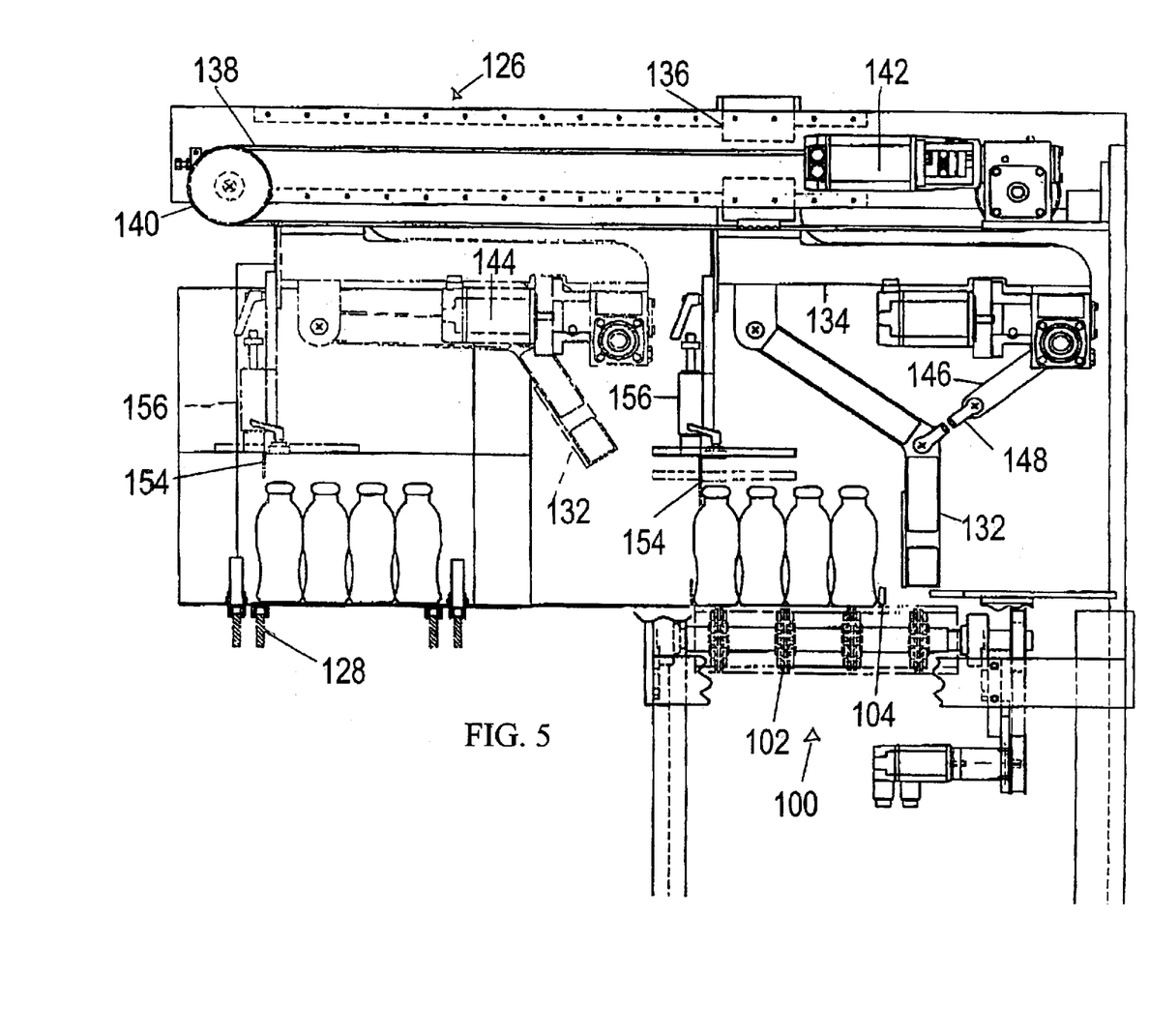
FIG. 5 shows an end view of the loading apparatus of FIG. 4, with portions and product being removed and/or shown in phantom to show construction details.

A first, stationary, adjustable lane guide 104 extends parallel to and collinearly with lane guide 88b. A stationary, adjustable loader guide 106 extends generally perpendicular to lane guide 104 and the conveying direction of loader conveyor 102 and is spaced from meter conveyor 12 generally equal to but slightly greater than the group depth. Loader guide 106 can be adjusted and fixed according to the number of rows in the pack pattern and/or product size. A second, retractable, lane guide 108 extends generally parallel to and collinearly with lane guide 88a and in the most preferred form shown is in the form of a flat, rectangular plate. Lane guide 108 is movable between an operative position extending above the upper run of belt 14 and of conveyor 102 and a retracted position at or below the upper run of belt 14 and of conveyor 102. It should be appreciated that lane guide 108 can be moved between its operative and retracted positions by any suitable provisions which are well known to persons skilled in the art. In the most preferred form, lane guide 108 is moved by an air actuator 109 having its cylinder suitably mounted to the apparatus frame and its piston connected to guide 108. Lane guide 104 can be adjusted and fixed according to the number of columns in the grid pattern and/or the product size.

In the preferred form, a retractable loader guide 110 is located between meter conveyor 12 and loader conveyor 102 and extends generally perpendicular between lane guides 104 and 108 and to the conveying direction of conveyors 12 and 102 and generally parallel to loader guide 106. In the most preferred form, loader guide 110 is shown in the form of a flat, rectangular plate. In particular, loader guide 110 is moveable between an operative position extending above the upper run of belt 14 and of conveyor 102 and a retracted position at or below the upper run of belt 14 and of conveyor 102. Further, in the most preferred form, loader guide 110 does not extend completely vertical or perpendicular to the upper run of belt 14 and conveyor 102 but extends at an obtuse angle to the upper run of belt 14 in the conveying direction or in other words the free edge of loader guide 110 is in the conveying direction downstream of the remaining portion of loader guide 110. It should be appreciated that loader guide 110 can be moved between its operative and retracted positions by any suitable provisions which are well known to persons skilled in the art. In the most preferred form, loader guide 110 is moved by an air actuator 112 having its cylinder suitably mounted to the apparatus frame and its piston connected to loader guide 110.

Loader apparatus 100 according to the preferred teachings of the present invention includes a loader 126 for transferring product from conveyor 102 to an offload platform shown in the most preferred form as a packaging conveyor 128. In the most preferred form, packaging conveyor 128 is in the form of endless roller chain including flights for receiving trays, pads, or other product wraps. Additionally, in the form shown, the roller chains are arranged for moving product parallel to the conveying direction of conveyors 12 and 102 and can be operated to move in the conveying direction or opposite to the conveying direction. However, packaging conveyor 128 can be arranged to move product in nonparallel directions to the conveying direction of conveyors 12 and 102 including but not limited to perpendicular thereto in either a horizontal or a vertical direction. Advantages of moving product by conveyor 128 other than parallel to and in the conveying direction is a change in apparatus footprint and specifically in a reduced overall linear length of apparatus 100 compared to when conveyor 128 is parallel to and in the conveying direction. Additionally, it can be appreciated that the offload platform can have other types and forms according to the teachings of the present invention including but not limited to an endless belt, and other manners of presenting trays, pads or- other product wraps for receiving product.

Loader 126 according to the preferred teachings of the present invention includes a pusher 132 for pushing product generally parallel to and between guides 104 and 108 and perpendicular to the conveying direction of conveyor 102. In the most preferred form shown, pusher 132 is generally in the shape of a hockey stick including a lower portion connected to an upper portion at an obtuse angle. The free end of the upper portion of pusher 132 is pivotally mounted to a carrier 134 which is movable generally horizontally and perpendicular to the conveying direction above conveyor 102. In the preferred form shown, carrier 134 is moveably mounted to the apparatus frame by linear bearings 136 of a conventional design. Carrier 134 in the preferred form is moved on linear bearings 136 and relative to the apparatus frame by its connection to an endless belt 138 extending around first and second pulleys 140 at least one of which is driven such as by a servomotor 142 through a gear box. Specifically, as one or both pulleys 140 are rotated, belt 138 moves and carries carrier 134 and pusher 132 attached thereto. In the most preferred form, carrier 134 and pusher 132 are movable relative to the apparatus frame and conveyor 102 from an initial position located on the opposite side of conveyor 102 than packaging conveyor 128 and a loaded position located on the same side of conveyor 102 as packaging conveyor 128. It should be appreciated that the manner of movably mounting and/or of moving carrier 134 relative to the apparatus frame shown is only exemplary as other manners exist and/or are within the level of ordinary skill once the teachings of the present invention are known.

In the preferred form, pusher 132 is movable relative to carrier 134 between a pushing position and a transport position and in the most preferred form is pivotably movable between the pushing position and the transport position. Specifically, in the preferred form shown, a servomotor 144 is mounted to and carried by carrier 134. A crank arm 146 is secured to the output shaft of servomotor 144. A turnbuckle 148 has its opposite ends pivotably secured to the free end of crank arm 146 and pusher 132 intermediate the upper and lower portions. In the pushing position, the lower portion of pusher 132 is generally vertically arranged, the upper portion of pusher 132 extends at the obtuse angle therefrom, and the crank arm 146 and turnbuckle 148 are linear and extend at an obtuse angle from the lower portion of pusher 132 to the servomotor 144. In the transport position, servomotor 144 is actuated such that crank arm 146 extends at an acute angle vertically upwardly, turnbuckle 148 extends vertically downwardly between the crank arm 146 and pusher 132, and the upper portion of the pusher 132 extends at a slight angle vertically upwardly from carrier 134 to crank arm 146. It should be appreciated that the manner of movably mounting and/or of moving pusher 132 relative to carrier 134 shown is only exemplary as other manners exist and/or are within the level of ordinary skill once the teachings of the present invention are known.

In operation of loader apparatus 100 and for purposes of explanation, loader guide 110 is in its retracted position, lane guide 108, if provided, is in its operative position, and it will be assumed that product is present in apparatus 80 between lane guides 88a and 88b up to the downstream end of conveyor 12 (at the division between lane guides 88a and 88b and at least conveyor 12 is stopped. Conveyors 12 and 102 are actuated such that product moves from conveyor 12 onto conveyor 102 with friction between product and conveyor 102 guiding the grid pattern while the columns remain abutting and the rows remain abutting in the grid pattern. It should be appreciated that the loader platform in the preferred form of loader conveyor 102 is advantageous in allowing transfer of product in the grid pattern and without tipping and/or slipping. In the preferred form shown, guides 104 and 108 can be optimally provided in the event that conveyor 102 is overdriven such that product engages loader guide 106 and conveyor 102 remains actuated resulting in product slipping on conveyor 102, with product extending perpendicularly between guides 104 and 108 in a similar manner as and in continuation of guides 88a and 88b. However, overdriving conveyor 102 is not desired or needed. Further, the loader platform, grid pattern maintenance, and/or tipping prevention can take other forms according to the teachings of the present invention.

Conveyor 12 in the preferred form stops after the rearward extent of the last row of the metered group passes from conveyor 12 and unto conveyor 102 and in the most preferred form, conveyor 102 remains actuated until the leading edge of the metered pack pattern is spaced slightly upstream of or just engages loader guide 106. After at least conveyor 12 has stopped in the preferred form, loader guide 110 is moved from its retracted position to its operative position behind the rearward extent of the last row of the metered pack pattern. In the most preferred form and due to the angular relationship of loader guide 110, the free edge of loader guide 110 engages the rearward extent of the last row of the metered pack pattern and could optionally push the metered pack pattern in the conveying direction until the leading edge of the continuous stream engages loader guide 106. However, separation of the metered pack pattern from the remaining continuous stream of product can be accomplished by other manners including but not limited to stopping actuation of conveyor 102 after conveyor 12. Either simultaneously or after loader guide 110 is moved to its operative position, guide 108, if provided, is moved from its operative position to its retracted position. Thus, a product group in the grid pattern is present on conveyor 102 and is separated from the continuous stream, with the product group located between loader guide 106 and loader guide 110.

After guide 108, if provided, is in its retracted position and for purposes of explanation, it will be assumed that pusher 132 is in its initial and pushing positions. Carrier 134 is moved from its initial position toward its loaded position such that the lower portion of pusher 132 engages and pushes product in the grid pattern. Product moves from conveyor 102 into conveyor 128 with loader guide 106 and loader guide 110 guiding the pack pattern while the columns remain abutting and the rows remain abutting in the pack pattern and product moves extending perpendicularly between loader guide 106 and loader guide 110. It should be appreciated that separation of the metered pack pattern from the remaining continuous stream of product insures that there is no interference between the last row of the pack pattern and the initial row of the continuous stream as the pack pattern is moved perpendicularly to the conveying direction.

After product is pushed off conveyor 102, loader guide 110 moves from its operative position to its retracted position, and lane guide 108, if provided, moves from its retracted position to its operative position. Further, pusher 132 moves from its pushing position to its transport position and moves from its loaded position to its initial position. It should be appreciated that pusher 132 in its transport position is able to clear incoming product on conveyor 102 such that the metering operation of conveyors 12 and 102 can commence as soon as pusher 132 clears conveyor 102 to decrease cycle time. However, it is possible to simply move pusher 132 between its initial position and loading position without movement relative to carrier 134 if the advantage of decreased cycle time is not desired and/or needed.

In the event that product is relatively tall versus its base size such that a tendency to tip exists, apparatus 100 according to the teachings of the present invention can include suitable provisions for preventing product tipping. In particular, an adjustable, retractable, product shield 150 is provided for abutting with the top portions of product defining the new leading edge of the continuous stream after separation of the metered pack pattern. In the most preferred form, shield 150 is moved by an air actuator 152 having its cylinder suitably mounted to the apparatus frame and its piston connected to shield 150. Shield 150 is movable between a noninterfering position above product moving on conveyor 12 and an abutting position for abutting with the top portions of product of the leading edge of the continuous stream to prevent their tipping into the volume of the loader platform defined by conveyor 102.

Similarly, an adjustable, retractable, product shield 154 is provided for abutting with the top portions of product of the metered pack pattern opposite to pusher 132. In the most preferred form, shield 154 is moved by an air actuator 156 having its cylinder suitably mounted to and movable with carrier 134 and its piston connected to shield 154. Thus, shield 154 moves with pusher 132 which are commonly mounted to carrier 134. Adjustment of shield 154 can be performed vertically such as by adjustment of the mounting of the cylinder of air actuator 156 on carrier 134 and/or horizontally such as by providing an adjustable mounting of shield 154 relative to the piston of air actuator 156. Shield 154 is movable between a non-interfering position above product on conveyor 128 and an abutting position for abutting with the top portion of product of the metered pack pattern to prevent their tipping when the metered pack pattern is being pushed by pusher 132.

Although shown and described with nestable product, apparatus 100 could be utilized for non-nestable product. As an example, with loader guide 110 in its operative position (possibly in a more vertical orientation than shown and described), conveyor 12 is overdriven to engage product on conveyor 12 with guide 110 and thus align them on conveyor 12. After alignment, loader guide 110 is moved to its retracted position and conveyor 12 is advanced a distance corresponding to the pack pattern and in the preferred form conveyor 102 is advanced a little further, with operation thereafter being similar as that described for nestable product.

Thus since the invention disclosed herein may be embodied in other specific forms without departing from the spirit or general characteristics thereof, some of which forms have been indicated, the embodiments described herein are to be considered in all respects illustrative and not restrictive. The scope of the invention is to be indicated by the appended claims, rather than by the foregoing description, and all changes which come within the meaning and range of equivalency of the claims are intended to be embraced therein.

What is claimed is:

1. Method for loading product comprising:
   guiding product in a conveying direction in a grid pattern with at least two parallel columns and multiple parallel rows, with the columns in the grid pattern abutting and with the rows in the grid pattern abutting, with the columns being parallel to the conveying direction;
   conveying product in the grid pattern until a pack pattern is transferred onto an unloader platform, with the pack pattern being maintained by product being conveyed from upstream of the pack pattern, with the pack pattern including the at least two parallel columns and at least two parallel rows;
   guiding product in the grid pattern being conveyed onto the unloader platform so that the columns in the pack pattern abut and the rows in the pack pattern abut;
   pushing the pack pattern from the unloader platform; and
   guiding product in the pack pattern being pushed from the unloader platform so that the columns in the pack pattern abut and the rows in the pack pattern abut.

2. The method of claim 1 with pushing the pack pattern comprising pushing the pack pattern from the unloader platform perpendicular to the conveying direction.

3. Method for loading product comprising:
   guiding product in a conveying direction in a and pattern with at least two parallel columns and multiple parallel rows, with the columns in the grid pattern abutting and with the rows in the grid pattern abutting, with the columns being parallel to the conveying direction;
   conveying product in the grid pattern until a pack pattern is transferred onto an unloader platform, with the pack pattern including the at least two parallel columns and at least two parallel rows;
   guiding product in the grid pattern being conveyed onto the unloader platform so that the columns in the pack pattern abut and the rows in the pack pattern abut;
   pushing the pack pattern from the unloader platform; and
   guiding product in the pack pattern being pushed from the unloader platform so that the columns in the pack pattern abut and the rows in the pack pattern abut, with pushing the pack pattern comprising pushing the pack pattern from the unloader platform perpendicular to the conveying direction, with guiding the product in the pack pattern comprising providing a first loader guide perpendicular to the conveying direction, with an initial row of the pack pattern abutting with the first loader guide while the pack pattern is pushed from the unloader platform; and providing a second loader guide perpendicular to the conveying direction and parallel to the first loader guide, with a last row of the pack pattern abutting with the second loader guide while the pack pattern is pushed from the unloader platform.

4. The method of claim 3 further comprising moving the second loader guide between an operative position and a retracted position, with the second loader guide in the retracted position not interfering with product when product is being conveyed in the grid pattern and is in the operative position when the pack pattern is being pushed.

5. The method of claim 4 further comprising pushing the last row of the pack pattern in the conveying direction with the second loader guide after stopping conveying product in the grid pattern and before pushing the pack pattern and as the second loader guide moves from the retracted position to the operative position.

6. The method of claim 4 with guiding product in the grid pattern comprising providing a first lane guide parallel to the conveying direction; and moving a second lane guide between an operative position parallel to the conveying direction and to the first lane guide and a retracted position not interfering with product when the pack pattern is being pushed.

7. The method of claim 4 with pushing the pack pattern comprising moving a pusher between an initial position and a loaded position, with the pusher moving from the initial position to the loaded position engaging with and pushing the pack pattern.

8. The method of claim 7 further comprising moving the pusher between a pushing position and a transport position, with the pusher being in the pushing position when moving from the initial position to the loaded position, with the pusher being in the transport position when moving from the loaded position to the initial position and not interfering with and above product being conveyed in the grid pattern.

9. The method of claim 8 with conveying product in the grid pattern comprising conveying product onto the unloader platform conveying product in the conveying direction.

10. The method of claim 9 with guiding product in the grid pattern comprising:
guiding product while being conveyed in the conveying direction into a nested pattern with at least two parallel columns and multiple parallel rows, with the columns in the nested pattern abutting and with the rows in the nested pattern abutting, with the nested pattern being maintained by product being conveyed from upstream of the nested pattern; and
guiding the nested pattern at an obtuse grid angle into the grid pattern, with the grid pattern being maintained by product being guided from upstream of the grid pattern, with the nested pattern being guided into the grid pattern while the columns remain abutting and the rows remain abutting.

11. The method of claim 2 with pushing the pack pattern comprising moving a pusher between an initial position and a loaded position, with the pusher moving from the initial position to the loaded position engaging with and pushing the pack pattern, with the method further comprising moving the pusher between a pushing position and a transport position, with the pusher being in the pushing position when moving from the initial position to the loaded position, with the pusher being in the transport position when moving from the loaded position to the initial position and not interfering with and above product being conveyed in the grid pattern.

12. Apparatus for loading products comprising, in combination:
an unloader platform for receiving product in a pack pattern;
an assembly intermittently conveying product in a conveying direction in a grid pattern onto the unloader platform, with the grid pattern being at least two parallel columns and multiple parallel rows, with the columns in the grid pattern abutting and with the rows in the grid pattern abutting, with the columns being parallel to the conveying direction;
a first loader guide on the unloader platform;
a second loader guide perpendicular to the conveying direction and spaced in the conveying direction from the assembly parallel to the first loader guide, with the second loader guide not interfering with product being conveyed in the conveying direction by the assembly; and
a pusher for pushing the pack pattern from the unloader platform and from between the first loader guide and second loader guide, with an initial row of the pack pattern separated from the grid pattern being guided by the first loader guide and a last row of the pack pattern being guided by the second loader guide as the pack pattern is being pushed from the unloader platform by the pusher.

13. The apparatus of claim 12 with the first and second loader guides being perpendicular to the conveying direction.

14. The apparatus of claim 13 with the second loader guide being movable between an operative position and a retracted position, with the second loader guide being in the operative position when the pusher is pushing the pack pattern and being in the retracted position when product is being conveyed by the assembly.

15. The apparatus of claim 14 with the second loader guide moving in the conveying direction to push the last row of the pack pattern as the second loader guide moves from the retracted position to the operative position.

16. The apparatus of claim 14 further comprising, in combination: first and second lane guides guiding product on the unloader platform with the first and second lane guides being parallel to the rows in the grid pattern and with the columns in the grid pattern abutting and with the rows in the grid pattern abutting, with the second lane guide not interfering with product being pushed by the pusher.

17. The apparatus of claim 16 with the second outside guide being movable between an operative position and a retracted position, with the second guide being in the operative position when the assembly is conveying product and being in the retracted position when the pusher is pushing product.

18. The apparatus of claim 14 with the pusher being movable between an initial position and a loaded position, with the pusher moving from the initial position to the loaded position engaging and pushing the pack pattern, with the pusher being movable between a pushing position and a transport position, with the pusher being in the pushing position when moving from the initial position to the loaded position, with the pusher being in the transport position when moving from the loaded position to the initial position and not interfering with and above product being conveyed in the grid pattern.

19. The apparatus of claim 18 with the assembly comprising, in combination: a first product conveyance mechanism, with product being conveyed by the first product conveyance mechanism in the conveying direction; a nesting guide portion including first and second outside nesting guides, with the first and second outside nesting guides guiding nestable product on the first product conveyance mechanism into a nested pattern with at least two columns extending parallel to the first and second outside nesting guides and multiple rows with the columns in the nested pattern abutting and the rows in the nested pattern abutting and being maintained in the nested pattern by product being conveyed in the first product conveyance mechanism; and a grid guide portion including first and second outside grid guides extending from the first and second nesting guides at a grid angle from an interconnection, with the spacing of the first and second outside grid guides at the interconnections being generally equal to a width of the product multiplied by the number of columns in the nested pattern, with the grid guide portion guiding the product into the grid pattern with the columns in the grid pattern extending parallel to the first and second grid guides and multiple rows with the columns in the grid pattern abutting and the rows in the grid pattern abutting and being maintained in the grid pattern by product being conveyed in the first conveying direction by the first product conveyance mechanism.

20. The apparatus of claim 12 with the grid pattern being maintained during conveying onto the unloader platform by product being conveyed upstream of the unloader platform.

* * * * *

UNITED STATES PATENT AND TRADEMARK OFFICE
CERTIFICATE OF CORRECTION

PATENT NO. : 6,793,064 B2
DATED : September 21, 2004
INVENTOR(S) : Richard Jerome Schoeneck and Ronald Matthew Gust

It is certified that error appears in the above-identified patent and that said Letters Patent is hereby corrected as shown below:

Column 15,
Line 41, please delete "tumbuckle" and insert -- turnbuckle --.
Line 55, please delete "lane guides 88a and 88b" and insert -- conveyors 12 and 102) --.

Column 18,
Line 9, please delete "and" and insert -- grid --.

Signed and Sealed this

Eighteenth Day of January, 2005

JON W. DUDAS
*Director of the United States Patent and Trademark Office*